United States Patent [11] 3,617,400

[72] Inventor Bernard B. Lampert
 Carmichael, Calif.
[21] Appl. No. 731,691
[22] Filed May 21, 1968
[45] Patented Nov. 2, 1971
[73] Assignee Aerojet-General Corporation
 El Monte, Calif.
 Continuation-in-part of application Ser. No. 693,690, Dec. 14, 1967, now Patent No. 3,429,755.

[54] NITROCELLULOSE-BASED SOLID ROCKET PROPELLANT CONTAINING A CARBAMATE PLASTICIZER
 9 Claims, No Drawings
[52] U.S. Cl. ................................................ 149/2,
 149/38, 149/42, 149/76, 149/92, 149/98, 149/100
[51] Int. Cl. ........................................................ C06b 19/00

[50] Field of Search ........................................... 149/38, 42,
 44, 92, 100, 88, 2, 76, 98

[56] References Cited
 UNITED STATES PATENTS
 3,073,731 1/1963 Cohen et al. .................... 149/100 X
 3,311,513 3/1967 Forrest ........................... 149/100 X Primary Examiner—Carl D. Quarforth
Assistant Examiner—Stephen J. Lechert, Jr.
Attorneys—Edward O. Ansell, D. Gordon Angus and T. Reid Anderson ABSTRACT: This patent describes novel nitrocellulose-containing propellants containing at least one carbamate plasticizer selected from the group consisting of 2-nitratoethyl-N-methyl-N-nitrocarbamate, and 2-nitratoethyl-N-nitratoethyl-N-nitrocarbamate to provide propellant curing at ambient or slightly elevated temperatures.

NITROCELLULOSE-BASED SOLID ROCKET PROPELLANT CONTAINING A CARBAMATE PLASTICIZER

This application is a continuation-in-part of applicant's earlier filed U.S. Pat. application Ser. No. 693,690, filed Dec. 14, 1967 now issued as U.S. Pat. No. 3,429,755, the disclosure of which is expressly incorporated herein by reference.

BACKGROUND OF THE INVENTION

The field of the present invention pertains to nitrocellulose-containing propellants.

It has been previously shown in French Pat. No. 1,094,959 that certain nitratocarbamate plasticizers in conjunction with nitrocellulose are useful in the fabrication of explosives. However, the nitratocarbamates have never been proposed for use in any application requiring controlled combustion, and hence were not previously considered in the preparation of the relatively slow burning solid propellants. Quite unexpectedly, I have now found that these nitratocarbamates can be used to plasticize the nitrocellulose in so-called double-base propellants to provide a solid propellant which will undergo gradual combustion in a rocket engine, and provides other significant advantages hereinafter more fully described.

In the nitrocellulose-type propellants (commonly referred to as double-base propellants), where the principal plasticizer is nitroglycerin, the propellants are currently cured at temperatures above about 110° F., or in the cases where ambient cure temperatures are used, the cure cycles are very long on the order of 30 days. The use of elevated temperatures and/or prolonged cure cycles are characterized by several disadvantages including isothermal shrinkage of the propellant which is usually greater than 1 percent, and the extended cure cycles per se which are expensive, since they tie up curing facilities and reduce production efficiency. Accordingly, there has been a longfelt need for a system in which double-base type propellants can be cured at ambient temperatures within relatively short periods of 1 to 6 days. According to the present invention, it has been discovered that this result can be achieved, thereby eliminating stresses and grain defects which resulted from the isothermal shrinkage encountered in prior art processes. In addition, it is now possibly by virtue of this invention to eliminate isothermal shrinkage without resorting to expensive processing techniques such as programmed cure or pressure cure.

SUMMARY OF THE INVENTION

Briefly, the present invention comprises the use of carbamates selected from the group consisting of 2-nitratoethyl-N-methyl-N-nitrocarbamate and 2-nitratoethyl-N-nitratoethyl-N-nitrocarbamate as plasticizers in nitrocellulose propellant systems to provide ambient propellant curing within a period of from about 2 to 6 days. The carbamate plasticizer is used in an effective plasticizing amount normally up to about 50 percent by weight of the propellant.

The present invention effectively reduces the cure temperature of nitroplastisol propellants to ambient or slightly elevated temperature without significant loss of performance potential and without the hazards attendant the use of nitroglycerin. In addition, ambient curing allows the use of additional propellants to replace the closure boots often used in solid propellant motors.

It is an object of the present invention to provide nitrocellulose-base propellants which are curable at low temperatures, on the order of ambient.

It is also an object of the present invention to provide nitrocellulose-base propellants having shortened cure cycles.

Still further it is an object of the present invention to provide a novel propellant having improved properties as a result of reduced shrinkage resulting from the cure conditions.

Specifically, it is an object of this invention to utilize nitrocellulose-base propellant formulations containing carbamate plasticizers to reduce the time and expense presently entailed in the production of nitrocellulose propellants.

These and other objects and advantages of this invention will be apparent from the more detailed description which follows.

DESCRIPTION OF PREFERRED EMBODIMENTS

As those skilled in the art will recognize, the use of the carbamates is not restricted to composite propellants but also applicable to smokeless propellant formulations, as is more fully shown by the following examples. Further, the invention is not limited exclusively to the use of carbamate plasticizers with pyrocellulose guncotton, but is applicable to pyroxylin as well. The carbamate plasticizers may be used alone or in conjunction with coplasticizers such as triethylene-glycol dinitrate, diethyleneglycol dinitrate, bis-dinitropropyl formal, bis-dinitropropyl acetal, adiponitrile, triacetin, and the like may also be used. The choice and concentration of the nitrocellulose, the optimum amount of carbamate plasticizer, and the use of coplasticizers will vary depending upon the particular performance characteristics and curing characteristics desired. However, those skilled in the art will be able to select the appropriate amount of the carbamate plasticizer required for any given propellant formulation. The essence of the present invention is the surprising discovery that these carbamates can be used to lower curing temperatures and shorten the cure cycles in nitrocellulose-base propellants.

The following examples are presented solely to illustrate the invention and should not be regarded as limiting in any way. In the examples, the parts and percentages are by weight unless otherwise indicated.

EXAMPLE I

2-Nitratoethly-N-methyl-N-mitrocarbamate may be used as a coplasticizer with other high energy plasticizers such as, bis-dinitropropyl formal and bis-dinitropropyl acetal (1/1) in composite nitroplastisol propellants. In the following example, beryllium powder is the metallic fuel and ammonium perchlorate is the oxidizer; plastisol grade nitrocellulose is the polymeric binder ingredient.

|  | Wt. % |
|---|---|
| Beryllium Powder | 14.00 |
| Ammonium Perchlorate | 41.00 |
| Resorcinol | 0.50 |
| Plastisol Grade Nitrocellulose | 13.35 |
| 2-Nitratoethyl-N-methyl-N-nitrocarbamate | 20.00 |
| 1/1 Mixture of bis-dinitropropyl Formal and bis-dinitropropyl Acetal | 11.15 |
|  | 100.00 |

This propellant was processed in a vertical mixer on 600 g. scale and cured at 80° F. After 3 days the Rex hardness was 75–80.

EXAMPLE II

In this example, 2-nitratoethyl-N-methyl-N-nitrocarbamate and 2-nitratoethyl-N-nitratoethyl-N-nitrocarbamate are the only plasticizers used.

|  | Wt. % |
|---|---|
| Beryllium Powder | 14.00 |
| Ammonium Perchlorate | 41.00 |
| Resorcinol | 0.50 |
| Plastisol Grade Nitrocellulose | 13.35 |
| 2-Nitratoethyl-N-methyl-N-nitrocarbamate | 4.45 |
| 2-nitratoethyl-N-nitratoethyl-N-nitrocarbamate | 26.70 |
|  | 100.00 |

After 3 days at 80° F. the Rex hardness of this propellant was 75–80.

EXAMPLE III

The following formulation demonstrates the use of a nitrocarbamate plasticizer in smokeless propellant.

| | Wt. % |
|---|---|
| Fluid Ball Powder "C" | 26.7 |
| 2-Nitratoethyl-N-nitratoethyl-N-nitrocarbamate | 40.0 |
| RDX | 33.3 |
| | 100.0 |

The mixture was bodied by heating (90°–110° F.) until a casting viscosity which precluded settling was attained. Good cure was obtained within 4 days at 80° F.

Example III above employs Fluid Ball Powder "C," a commercially available (Olin-Mathieson Chemical Co.) nitrocellulose with the following composition: 75 percent nitrocellulose, 1.5 percent 2-nitrodiphenylamine, 23 percent nitroglycerin, 0.4 percent carbon black, and 0.15 percent (added) coating agent.

It is also to be understood that the curing times and temperatures per se are not critical. Thus, lower temperatures require longer times while higher temperatures shorten the cure times. In any case, by the practice of this invention complete cure can be has within several days at ambient or moderate temperatures and the properties are enhanced because of the elimination of the exposure of the propellant to elevated temperatures for prolonged periods. For these reasons, the present invention will find wide application in the field of solid rocket propellants. The propellants of the present invention are castable within a casing and can be fitted with conventional nozzles, igniters and the like.

The propellants of this invention may contain, in addition to those other additives discussed above, metal fuels (aluminum, beryllium, etc.), solid oxidizers (ammonium perchlorate, etc.), antioxidants, and the like. These additives are familiar to those skilled in the art, and need not be discussed at length here.

Having fully described the invention it is intended that it be limited only by the lawful scope of the appended claims.

I claim:

1. A novel nitrocellulose-based solid rocket propellant containing a carbamate plasticizer selected from the group consisting of 2-nitratoethyl-N-methyl-N-nitrocarbamate and 2-nitratoethyl-N-nitratoethyl-N-nitrocarbamate to provide propellant curing at ambient or slightly elevated temperatures.

2. The propellants of claim 1 containing a metal fuel.

3. The propellants of claim 1 containing a solid oxidizer.

4. The propellants of claim 1 wherein the nitrocellulose is pyrocellulose guncotton.

5. A novel ambient temperature-curable propellant formulation comprising nitrocellulose and a carbamate plasticizer selected from the group consisting of 2-nitratoethyl-N-methyl-N-nitrocarbamate and 2-nitratoethyl-N-nitratoethyl-N-nitrocarbamate.

6. The method of forming a nitrocellulose-based rocket propellant at ambient temperatures which comprises forming a curable formulation containing nitrocellulose and a carbamate plasticizer selected from the group consisting of 2-nitratoethyl-N-methyl-N-nitrocarbamate and 2-nitratoethyl-N-nitratoethyl-N-nitrocarbamate and curing said formulation.

7. The method of claim 6 wherein curing is carried out for about 2 to 4 days.

8. The method of claim 6 wherein the formulation contains a metal fuel.

9. The method of claim 6 wherein the formulation contains a solid oxidizer.

* * * * *